(12) United States Patent
Opalach et al.

(10) Patent No.: US 8,189,855 B2
(45) Date of Patent: May 29, 2012

(54) PLANOGRAM EXTRACTION BASED ON IMAGE PROCESSING

(75) Inventors: Agata Opalach, Opio (FR); Andrew Fano, Lincolnshire, IL (US); Fredrik Linaker, Antibes (FR); Robert Bernard (Robin) Groenevelt, Antibes (FR)

(73) Assignee: Accenture Global Services Limited, Dublin (IE)

( * ) Notice: Subject to any disclaimer, the term of this patent is extended or adjusted under 35 U.S.C. 154(b) by 995 days.

(21) Appl. No.: 11/849,165

(22) Filed: Aug. 31, 2007

(65) Prior Publication Data

US 2009/0059270 A1 Mar. 5, 2009

(51) Int. Cl.
*G06K 9/00* (2006.01)
*G06K 9/62* (2006.01)
*G06K 9/68* (2006.01)

(52) U.S. Cl. ......... 382/100; 382/209; 382/218; 382/219

(58) Field of Classification Search .................. 382/100, 382/209, 217, 218
See application file for complete search history.

(56) References Cited

U.S. PATENT DOCUMENTS

| | | | | |
|---|---|---|---|---|
| 3,651,478 | A | * | 3/1972 | Shandlay .................. 705/28 |
| 4,493,105 | A | | 1/1985 | Beall et al. |
| 4,797,819 | A | | 1/1989 | Dechirot |
| 4,947,322 | A | * | 8/1990 | Tenma et al. ................ 705/8 |
| 5,383,111 | A | | 1/1995 | Homma et al. |
| 5,465,115 | A | | 11/1995 | Conrad et al. |
| 5,497,314 | A | | 3/1996 | Novak |
| 5,511,134 | A | | 4/1996 | Kuratomi |
| 5,671,362 | A | | 9/1997 | Cowe et al. |
| 5,963,920 | A | | 10/1999 | Rose et al. |
| 6,075,535 | A | | 6/2000 | Fitzhugh |
| 6,204,763 | B1 | | 3/2001 | Sone |
| 6,341,269 | B1 | | 1/2002 | Dulaney et al. |
| 6,549,891 | B1 | * | 4/2003 | Rauber et al. .................. 705/28 |

(Continued)

FOREIGN PATENT DOCUMENTS

DE 10033652 A1 1/2002

(Continued)

OTHER PUBLICATIONS

"Smart carts, Veggie Vision in grocery stores to come", www.usatoday.com/tech/news/techinnovations/2003-09-26-future-grocery-shop_x.htm.

(Continued)

*Primary Examiner* — Bhavesh Mehta
*Assistant Examiner* — Utpal Shah
(74) *Attorney, Agent, or Firm* — Vedder Price PC

(57) ABSTRACT

Image analysis techniques, including object recognition analysis, are applied to images obtained by one or more image capture devices deployed within inventory environments. The object recognition analysis provides object recognition data (that may include one or more recognized product instances) based on stored product (training) images. In turn, a variety of functionalities may be enabled based on the object recognition data. For example, a planogram may be extracted and compared to a target planogram, or at least one product display parameter for a product can be determined and used to assess presence of the product within the inventory environment, or to determine compliance of display of the product with a promotional objective. In yet another embodiment, comparisons may be made within a single image or between multiple images over time to detect potential conditions requiring response. In this manner, efficiency and effectiveness of many previously manually-implemented tasks may be improved.

25 Claims, 8 Drawing Sheets

U.S. PATENT DOCUMENTS

| | | | |
|---|---|---|---|
| 6,678,413 B1 | 1/2004 | Liang et al. | |
| 6,697,787 B1 | 2/2004 | Miller | |
| 6,705,522 B2 | 3/2004 | Gershman et al. | |
| 6,707,381 B1 | 3/2004 | Maloney | |
| 6,711,293 B1 | 3/2004 | Lowe | |
| 6,919,795 B2 | 7/2005 | Roseen | |
| 7,016,045 B2 | 3/2006 | Kwon | |
| 7,043,075 B2 | 5/2006 | Gutta | |
| 7,054,467 B1 | 5/2006 | Honda | |
| 7,100,824 B2 | 9/2006 | Ostrowski et al. | |
| 7,168,618 B2 | 1/2007 | Schwartz | |
| 7,245,221 B2 | 7/2007 | Claudatos et al. | |
| 7,245,558 B2 | 7/2007 | Willins et al. | |
| 7,246,745 B2 | 7/2007 | Hudnut et al. | |
| 7,290,707 B2 * | 11/2007 | Sawasaki | 235/385 |
| 7,334,729 B2 | 2/2008 | Brewington | |
| 7,356,495 B2 | 4/2008 | Beigl et al. | |
| 7,392,948 B2 | 7/2008 | Smith et al. | |
| 7,493,336 B2 * | 2/2009 | Noonan | 1/1 |
| 7,588,188 B2 | 9/2009 | Ciarlante et al. | |
| 7,634,131 B2 | 12/2009 | Nakajima et al. | |
| 7,693,757 B2 * | 4/2010 | Zimmerman | 705/28 |
| 7,699,226 B2 * | 4/2010 | Smith et al. | 235/451 |
| 7,765,231 B2 | 7/2010 | Rathus et al. | |
| 7,806,335 B2 | 10/2010 | Knowles et al. | |
| 7,844,080 B2 | 11/2010 | Itoh | |
| 7,853,100 B2 | 12/2010 | Sundstrom et al. | |
| 2002/0138374 A1 | 9/2002 | Jennings et al. | |
| 2002/0147597 A1 | 10/2002 | Connors et al. | |
| 2003/0154141 A1 * | 8/2003 | Capazario et al. | 705/27 |
| 2003/0164754 A1 * | 9/2003 | Roseen | 340/309.16 |
| 2003/0227392 A1 | 12/2003 | Ebert et al. | |
| 2004/0056091 A1 | 3/2004 | Overhultz et al. | |
| 2004/0095380 A1 | 5/2004 | Bass et al. | |
| 2004/0194129 A1 | 9/2004 | Carlborn et al. | |
| 2005/0060247 A1 | 3/2005 | Tien | |
| 2005/0168345 A1 | 8/2005 | Swafford, Jr. et al. | |
| 2005/0213934 A1 | 9/2005 | Kinjo | |
| 2005/0234778 A1 | 10/2005 | Sperduti et al. | |
| 2006/0095331 A1 * | 5/2006 | O'Malley et al. | 705/22 |
| 2006/0149634 A1 * | 7/2006 | Pelegrin et al. | 705/22 |
| 2006/0155592 A1 | 7/2006 | Burkert et al. | |
| 2006/0164247 A1 | 7/2006 | Overhultz et al. | |
| 2006/0214792 A1 | 9/2006 | Goyal et al. | |
| 2007/0069867 A1 * | 3/2007 | Fleisch et al. | 340/309.16 |
| 2007/0073641 A1 | 3/2007 | Perry et al. | |
| 2007/0100713 A1 | 5/2007 | Del Favero et al. | |
| 2007/0179921 A1 * | 8/2007 | Zitnick et al. | 706/20 |
| 2007/0192294 A1 | 8/2007 | Ramer et al. | |
| 2007/0235465 A1 | 10/2007 | Walker et al. | |
| 2007/0250409 A1 | 10/2007 | Levy | |
| 2007/0260429 A1 | 11/2007 | Vera et al. | |
| 2008/0027838 A1 | 1/2008 | Sawasaki | |
| 2008/0077511 A1 * | 3/2008 | Zimmerman | 705/28 |
| 2008/0103939 A1 | 5/2008 | Gibb | |
| 2008/0140478 A1 * | 6/2008 | Goldberg et al. | 705/7 |
| 2008/0144934 A1 | 6/2008 | Raynaud | |
| 2008/0215462 A1 | 9/2008 | Sorensen et al. | |
| 2008/0306787 A1 * | 12/2008 | Hamilton et al. | 705/7 |
| 2009/0072029 A1 | 3/2009 | Martin | |
| 2010/0070388 A1 | 3/2010 | Spindler et al. | |

FOREIGN PATENT DOCUMENTS

| | | |
|---|---|---|
| EP | 1030521 A1 | 8/2000 |
| EP | 1445718 A1 | 2/2003 |
| EP | 2103891 A1 | 9/2009 |
| JP | 2001-088912 | 3/2001 |
| JP | 2001-128814 | 5/2001 |
| WO | 0201529 A1 | 1/2002 |
| WO | 2008029159 A1 | 3/2008 |

OTHER PUBLICATIONS

"The Structured Environment: Applying Regularities to Agent Design", A Dissertation submitted to the Faculty of the Division of the Physical Sciences in Candidacy for the Degree of Doctor of Philosophy, Department of Computer Science, by Daniel Douglas Fu. Dec. 1997, University of Chicago, Chicago, Illinois.

"Object instance recognition using triplets of feature symbols", Zitnick, C. Lawrence; Sun, Jie; Szcliski, Richard; Winder, Simon; MSR-TR-2007-53, Georgia Institute of Technology, Microsoft Research.

"Recognizing Groceries in situ using in vitro Training Data", Merler, Michele, Gallegyguillos, Carolina, and Belongie, Serge, ISBM: 1-4244-1179-3, 2007 IEEE Conference on Computer Vision and Pattern Recognition, Jun. 17, 2007.

"RoboCart: Toward Robot-Assisted Navigation of Grocery Stores by the Visually Impaired," Kulyukin, Validmer, Gharpure, Chaitanya, Nicolson, John, Computer Science Assistive Technology Laboratory, Department of Computer Science, Utah State University, Logan Utah, USA, ISBN:—7803-8912-3, International Conference on Intelligent Robots and Systems, 2005, Aug. 2, 2005.

"Green Machine", Schechter, Bruce, Think Research, www.domino.research.ibm/com/comm/wwwr_thinkresearch.nsf/pages/machine 399.html. No. 3, 1999.

"Welcom to Pro Corp" http:/www.pro-corp.com, printed Jul. 26, 2007.

Official Action dated Nov. 24, 2010 in U.S. Appl. No. 11/849,177.

European Examination Report issued on Feb. 10, 2011 in Application No. 08828590.3.

"Recognizing Groceries in situ using in vitro Training Data", Merler, Michele; Galleguillos, Carolina; and Belongie, Serge.

"RoboCart: Toward Robot-Assisted Navigation of Grocery Stores by the Visually Impaired", Kulyukin, Vladimir; Gharpure, Chaitanya; Nicholson, John, Computer Science Assistive Technology Laboratory, Department of Computer Science, Utah State University, Logan Utah USA.

"The Structured Environment: Applying Regularities to Agent Design", A Dissertation submitted to the Faculty of the Division of the Physical Sciences in Candidacy for the Degree of Doctor of Philosophy, Department of Computer Science, by Daniel Douglas Fu, Dec. 1997, University of Chicago, Chicago, Illinois.

"Green Machine", Schechter, Bruce, Think Research, www.domino.watson.ibm.com/comm/wwwr_thinkresearch.nsf/pages/machine399.html.

"Welcome to Pro Corp", http://www.pro-corp.com.

* cited by examiner

PLANOGRAM EXTRACTION BASED ON IMAGE PROCESSING

CROSS-REFERENCE TO RELATED APPLICATIONS

The present invention is related to co-pending applications having U.S. Patent Application Ser. Nos. 11/849,171; 11/849,177 and 11/849,180, filed on even date herewith.

FIELD OF THE INVENTION

The instant disclosure relates generally to inventory management and, in particular, to techniques for inventory management based on image analysis techniques.

BACKGROUND OF THE INVENTION

Currently, inventory management, i.e., the presentation and maintenance of adequate levels of stock on product support devices (e.g., shelves, racks, display stands, aisle endcap displays, etc.) is a continuing and labor-intensive effort. For example, in order to provide a good presentation to customers, it is desirable to maintain displayed stock levels as close as possible to the maximum levels. In the event that certain products run out and are no longer displayed on the shelves (sometimes referred to as a "stock out"), store operators typically lose significant revenue because customers are either unable to find the products they desire to purchase, or they fail to recognize an opportunity to purchase products on impulse. In addition, it may be difficult to recognize low inventory or stock out situations in a supply room or warehouse, leading to delays in reordering. In order to address this, stock clerks or other personnel are tasked with constantly monitoring the displayed stock and responding when displayed stock runs low or when the display of the products on the shelves is sub-optimal, e.g., disorganized, misplaced, etc. As this is a strictly manual process, such efforts tend to be relatively expensive and occasionally prone to error. These problems associated with manually monitoring inventory in retail environments are equally applicable to non-retail environments where maintenance of inventory levels is nevertheless important, e.g., warehouses.

In a similar vein, it is often the case that the manufacturers of certain products enter into agreements with retailers to ensure that their products are displayed in a particular manner. Thus, it becomes necessary to continually audit the performance by the retailers in properly displaying the manufacturer's products. However, such auditing and verification tasks have previously been implemented manually. That is, agents are typically sent into the field to personally inspect a given retailer's operations to verify compliance with the promotional campaign. Given the sheer number of possible retailers for a given product, such a manual solution quickly becomes cost prohibitive thereby requiring only spot checks, which is less than an optimal solution.

Therefore, it would be advantageous to provide techniques that automate many of these verifications of stock inventory and display tasks that have previously been addressed using manual techniques. It would be further beneficial if such automated techniques could be used to provide more detailed understanding of how products are actually displayed.

SUMMARY OF THE INVENTION

The instant disclosure describes various techniques that overcome the above noted limitations of prior art techniques through the use of image analysis techniques including, but not limited to, object recognition analysis techniques applied to images obtained by one or more image capture devices deployed within inventory environments. In particular, either upon request or automatically, one or more images may be captured by an image capture device within an inventory environment and subsequently provided to an image analysis capability preferably implementing object recognition techniques. The object recognition analysis provides object recognition data, which may include one or more recognized product instances within the received image(s), based on stored product images. In turn, a variety of functionalities may be enabled based on the object recognition data. For example, in one embodiment of the present invention, a planogram may be extracted from the one or more images analyzed in this manner. In this embodiment, the object recognition analysis is based on those store product images selected according to one or more candidate products included in a configuration profile. The extracted planogram may include images of products corresponding to the at least one recognized product instance at locations within the planogram reflecting the actual location of the products within the inventory environment. Thereafter, the extracted planogram may be compared to a target (i.e., previously extracted or optimal) planogram and performance measures based on the differences can be calculated.

In another embodiment, the object recognition data may be used to determine at least one product display parameter for a product displayed within the inventory environment. In turn, the product display parameters may be used to determine presence and location of the product within the inventory environment, or to determine compliance of display of the product with a promotional objective. In yet another embodiment, comparisons may be made within a single image or between multiple images over time. In this manner, potential conditions requiring response by appropriate personnel may be quickly detected. For example, images may be analyzed in this manner to detect one or more stock out features within the images. Thereafter, an indication of at least a partially depleted stock condition is provided if such features are detected. In still another embodiment, the product display parameters may be used to assess compliance of the manner in which the product is displayed with a promotional objective. As a result, the present invention automates many tasks previously implemented using manual techniques, thereby greatly enhancing efficiency and effectiveness of operations requiring maintenance of inventory.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
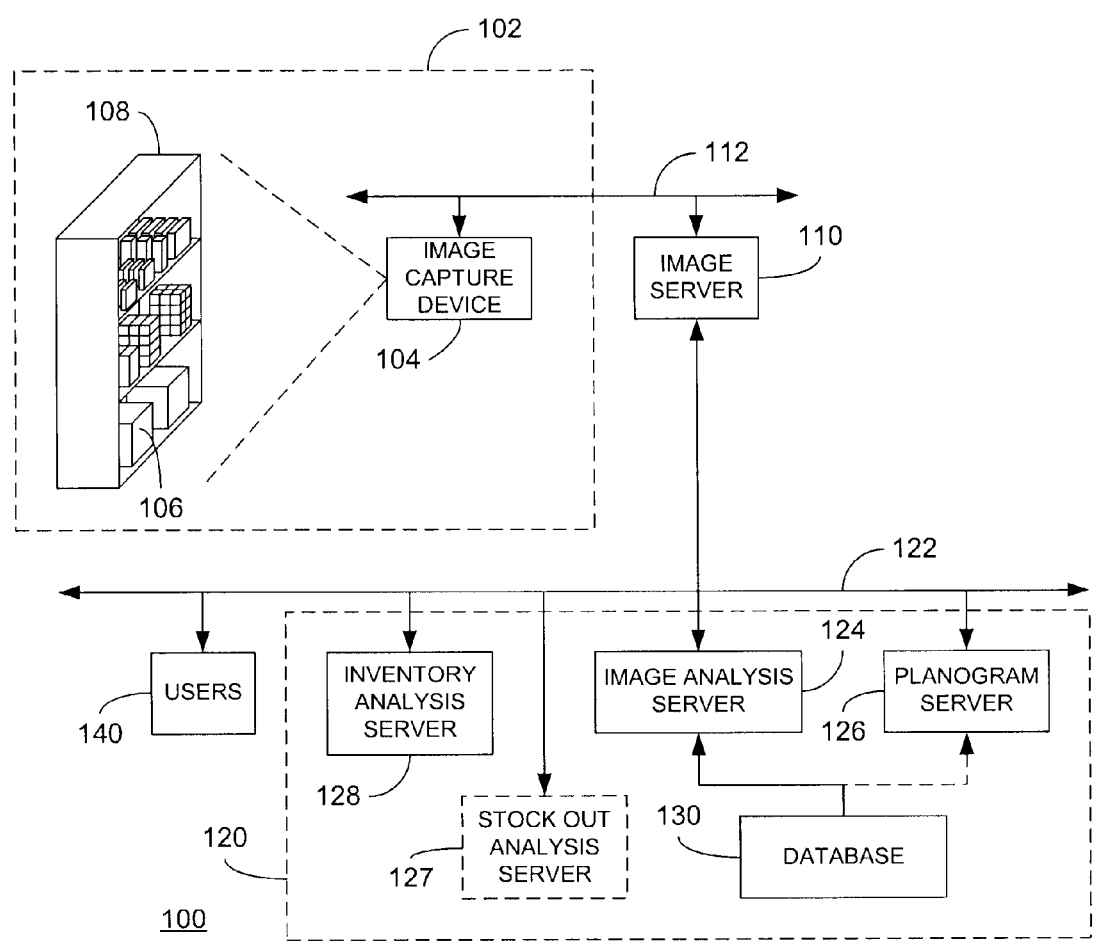
FIG. 1 is a schematic block diagram of a system in accordance with an embodiment of the present invention.

A more detailed description of the various embodiments of the present invention is provided with further reference to FIGS. 1-10. Referring now to FIG. 1, a system 100 is illustrated comprising one or more image capture devices 104 deployed within an inventory environment 102. Within the inventory environment 102, a variety of products 106 are displayed on various product support devices 108. The image capture devices 104 communicate with an image server 110 via a first network 112. Although illustrated as being outside the inventory environment 102, the image server 110 may be deployed within the inventory environment 102. The image capture devices 104, which may comprise still image or video cameras that can be rotated, panned, etc. may be mounted at one or more locations within the inventory environment 102. Alternatively, or additionally, the image capture devices may comprise relatively mobile (potentially wireless) still image or video cameras mounted on any of a number of movable objects including, but not limited to, fixed tracks that guide movement of the image capture devices, shopping or stocking carts, or even persons moving about the inventory environment 102. Further still, the image capture devices 104 may operate using different portions of the electromagnetic spectrum, i.e., visible wavelengths and/or infrared wavelengths. Because, as described below, the location of a given image capture device 104 may be useful, or even necessary, to the various techniques described herein. In the case of fixed image capture devices 104, such location information may be known implicitly. In the case of relatively mobile image capture devices, as described above, varying degrees of location information may be provided in potentially different ways. For example, location information may be manually provided by a person operating the mobile image capture device. Alternatively, the images that are captured by the mobile image capture devices may be used to infer its location. For example, in one embodiment, location-unique markings (e.g. glyphs, barcodes, etc.) may be positioned throughout the inventory environment such that they may be recognized (as described below) and decoded to ascertain the location information. In yet another embodiment, other information present in the captured images may be used to infer location information. Based on previous knowledge of expected locations for specific products or groups of products, subsequent recognition of those products in one or more captured images may serve as the basis for inferring that the image capture device was at the expected location for those products at the time the one or more images were captured. Where products may have multiple locations, disambiguation can be performed by noting expected unique characteristics such as the proximity of other products, the height at which the products are detected, the number of facings, etc.

The image server 110, in turn, may comprise a computing platform, such as a server computer implementing suitable software capable of receiving captured images from and, optionally, providing control signaling to the image capture devices 104, as known in the art. Based on knowledge of the layout of a given inventory environment (e.g., where specific products and cameras are supposed to be located or, more simply, through coordinates provided to it), the image server 110 may select appropriate image captures devices 104 (as well as proper orientation of such devices) in response to requests. Although the first network 112 may comprise virtually any type of network useful for conveying image data from (and, optionally, control signals to) image capture devices 104, a task-specific network such as a closed-circuit television network (CCTV) or the like may also be employed. Generally, the inventory environment may comprise any environment in which products 106 are stored and/or displayed in a structured manner such as, but not limited to, grocery stores, clothing stores, consumer electronics stores, department stores, warehouses, etc. The structured display within the inventory environment 102 may be based on the use of one or more product support devices 108 such as racks, shelves, vertical displays, endcap displays, etc. known to those of ordinary skill in the art.

In the illustrated embodiment, the image server 110 is in communication with various components 124-130 via a second communication network 122. Once again, the second network 122 may comprise virtually any suitable networking technology including, in a presently preferred embodiment, an Internet Protocol-based network including, but not limited to, the Internet or World Wide Web. Collectively, the components 124-130 constitute an automated inventory management system 120, although it will be appreciated that one or more of the components 124-130 could be consolidated into a single component, e.g., a single server computer. In the embodiment shown, an image analysis server 124 is in communication with a planogram server 126 and an inventory analysis server 128. In turn, both the image analysis server 124 and planogram server 126 are in communication with a database 130. The various components 124-128 of the automated inventory management system 120 may communicate with one or more users 140 via the second communication network 122 (or yet another, e.g., wireless, network). The users 140 may comprise any party involved with or otherwise interested in the management of inventory including, but not limited to, stock clerks, store managers, advertisers, a retailer's head office, etc. In a presently preferred embodiment, each of the users 140 may be provided with a suitable communication device, such as a computer, mobile phone, pager, personal digital assistant, etc. as needed to receive indications (described in further detail below) provided by the various components 124-128. As known in the art, the second communication network 122 may be adapted to communicate with any wireless devices associated with the users 140 as needed.

The image analysis server 124 performs image analysis techniques on images preferably received from the image server 110 (or any other source). The images received by the image analysis server may be in response to specific requests issued by the image analysis server 124 to the image server 110 (i.e., pulled), or they may automatically provided by the image server 110 to the image analysis server 124 without prior requests (i.e., pushed). Preferably, the image analysis server 124 is embodied using one or more suitable computing platforms, such as a commercially available personal computer, comprising at least one processor (e.g., microprocessor, microcontroller, digital signal processor, application-specific integrated circuit, programmable logic, etc. or combinations thereof) capable of executing stored instructions implementing various image processing techniques. In a presently preferred embodiment, the image analysis server 124 implements object recognition techniques based, for example, on the so-called scale-invariant feature transform (SIFT) algorithm described in David G. Lowe, "Distinctive image features from scale-invariant keypoints," International Journal of Computer Vision, 60, 2 (2004), pp. 91-110. and U.S. Pat. No. 6,711,293, the entirety of which are incorporated herein by this reference, which is particularly useful because of its ability to recognize instances of objects in images (based on training images) despite changes in scale, rotation, viewpoint, changes in lighting conditions, etc. Another technique for object recognition is taught in Published U.S. Patent Application No. 2007/0179921 A1, which is also incorporated herein by this reference. Generally, when based on one or more training images of objects to be recognized, such algorithms provide an identification of the objects recognized in the image, locations for the recognized objects within the image as well as probabilities that the objects are, in fact, in the image. Still other, potentially more computationally-efficient, techniques for recognizing certain features within images may be employed. For example, brightness levels of various portions of an image can be employed to detect darker regions (i.e., shadows) of an image, being potentially indicative of a lack of products at a given location. Furthermore, detection of regions of uniform color (as opposed to the non-uniform coloring typically used in product packaging) could be used to again detect a lack of products in a given region. Further still, the detection of vertical lines (using, for example, a Harris detector) and characters (using optical character recognition) are an indication of product presence, whereas the lack of such features is an indication of product absence. In yet another embodiment, shape detection may be employed to detect the overall shape of certain packaging. As different techniques may be best for different parts of an inventory environment, or even different parts of the same product support device, data concerning preferred techniques for different regions of an inventory environment (or different parts of a specific location within the inventory environment) can be maintained by, for example, the image server 110 and/or image analysis server 124.

As known in the art, a planogram is, at a minimum, a list of products (using any convenient identification scheme), positions of the products (e.g., x, y, z coordinates for the center of product) and orientations (3 angles) of a "major surface"—typically the front surface—of the products. Although not required, planograms may also comprise a diagram of fixtures and products that graphically illustrates this data, i.e., how and where products should be displayed, usually on a store shelf or other product support device. Often, planograms are provided by product vendors and designed in order to increase customer purchases. It is anticipated that planograms reflecting the current state of a given inventory environment may be beneficially employed for a number of purposes, as described in greater detail below. To this end, the planogram server 126, similar to the image analysis server 124, is preferably embodied using one or more suitable computing platforms comprising at least one processor capable of executing stored instructions implementing software routines capable of generating a planogram based on the results provided by the image analysis server, i.e., the identifications and locations (within an image or images) of one or more recognized product instances, as described in further detail below. A database 130 is provided for use in conjunction with both the image analysis server 124 and, optionally, the planogram server 126. In a presently preferred embodiment, the database 130 stores a plurality of stored product images and/or features and characteristics of the images and the products that may be used by the object recognition software implemented by the image analysis software 124 as training data, and that may be used in the planogram server 126 when assembling extracted planograms based on recognized object instances. As known in the art, the database 130 may be implemented using suitably programmed storage servers with appropriate database and database query software.

The inventory analysis server 128 (which is once again preferably embodied using one or more suitable computing platforms comprising at least one processor capable of executing stored instructions implementing software routines) may be used to implement a variety of inventory related tasks as well as promotional compliance related tasks described below with further reference, for example, to FIG. 8. If desired, those functions, described below, associated with stock out determinations may be optionally performed on a dedicated stock out analysis server 127 (implemented using hardware platforms similar to the other illustrated servers). It is finally noted that the particular configuration of servers and databases 124-130 illustrated in FIG. 1 is for illustrative purposes and that those of ordinary skill in the art will appreciate that various other configurations (possibly comprising additional networking equipment not shown) may be equally employed.

Figure 2:
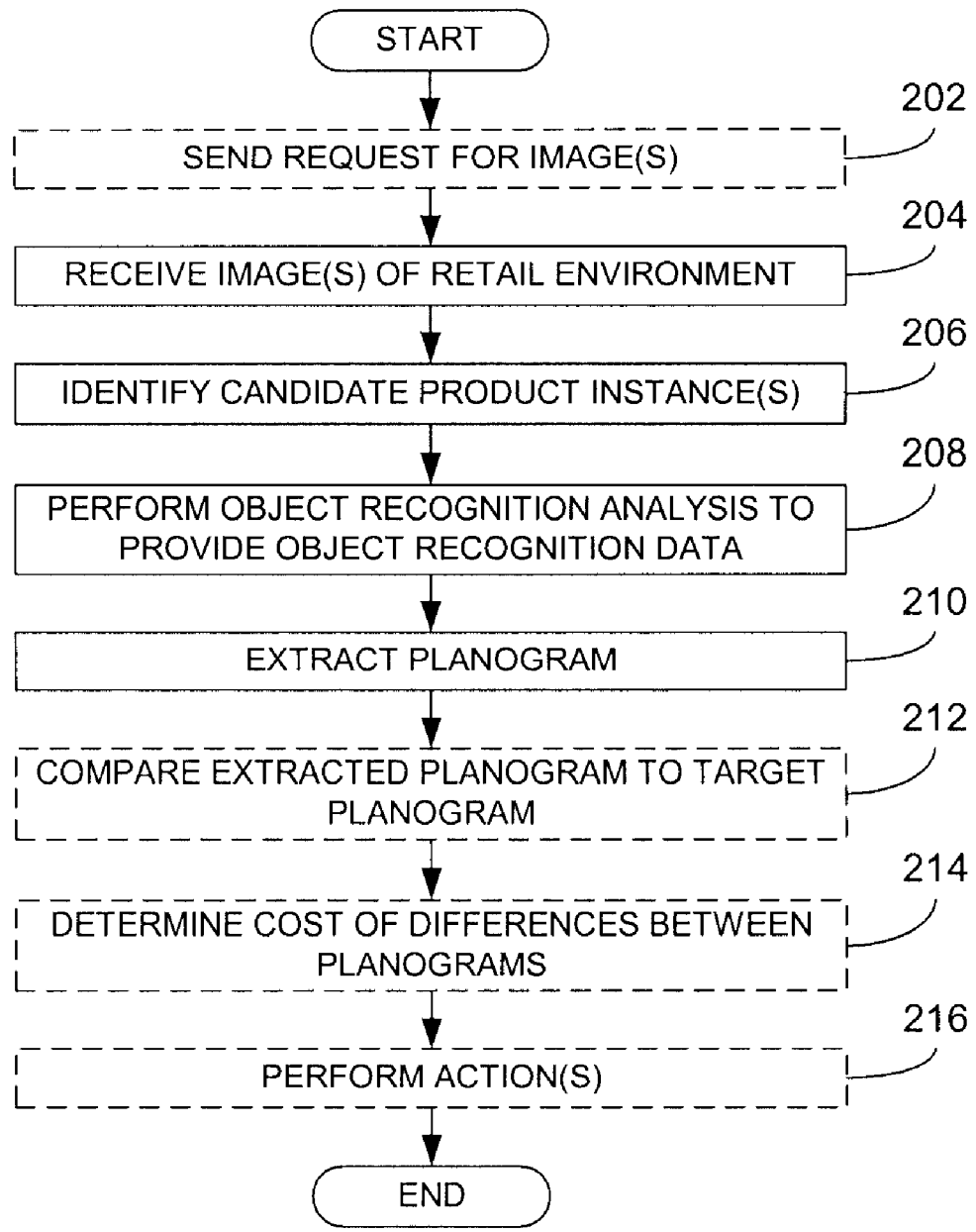
FIG. 2 is a flow chart illustrating a technique for automatic extraction of planograms in accordance with an embodiment of the present invention.

Referring now to FIG. 2, a flow chart in accordance with an embodiment of the present invention is illustrated. In a presently preferred embodiment, the techniques illustrated by the flow chart of FIG. 2 (as well as FIGS. 5 and 8-10) are preferably implemented using the system 100 illustrated in FIG. 1. Furthermore, the various blocks illustrated in FIG. 2 are preferably carried out using executable instructions stored in suitable processor-readable media and executed by suitable processing devices. Beginning with block 202, a request for one or more images may be provided to the image capture device 104. For example, the image analysis server 124 may send a request via the second network 122 to the image server 110 for the one or more images. In turn, the image server 110 may control the image capture device 104 (e.g., direct it to point to a particular location within the inventory environment or to a particular product support device, etc.) to obtain the desired images. Conversely, instead of obtaining images in response to specific requests, the image capture device 104 may automatically and/or continuously obtain images and provide them to the image server 110. Thereafter, the image server 110 may likewise automatically provide the desired images to the image analysis server 124 without prior request. Regardless of the manner in which the images are requested (pulled) or automatically provided (pushed), metadata or similar information for each image may include information identifying image (in the form, for example, of an identification of a particular image capture device and its orientation and location, or an identification of a particular region being captured in the image) as well as a relative time that the image was captured.

Regardless of the matter in which they are received at block 204, processing continues at block 206 where one or more candidate products are identified based on a configuration profile. As used herein, a candidate product comprises identification of either a specific product or a class of products. For example, "COKE" and "PEPSI" are examples of brands of specific products whereas "soft drinks" is an example of a specific class of products. The use of specific classes of products may be particularly useful in those instances in which the outward configurations of the various specific products in a class of products generally adhere to features that are relatively generic to the class of products. For example, in the case of "soft drinks" as a class of products, the shape of individual cans or bottles of such products may be very similar to each other, thereby allowing the use of training images that are generic to the class. In this manner, the present invention may be used to not only recognize specific products but also to recognize classes of products. The configuration profile comprises a textual description of what is expected within a given image. For example, where the image capture devices 104 are mounted in known locations and, therefore, may be correlated to the particular expected product(s) within their field of view, the configuration profile may list those products expected within the field of view of one or more particular image capture devices. In this manner, the list of stored product images used by the object recognition analysis (i.e., the training images) may be substantially reduced, thereby improving efficiency of the object recognition analysis.

Continuing at block 208, object recognition analysis, based at least in part upon the one or more candidate products identified at block 206, is performed on the image to provide object recognition data. As used herein, the output of the object recognition analysis, i.e. the object recognition data, includes identification of any recognized products in the image as well as appropriate indications (e.g., probabilities) that corresponding products are, in fact, in the image, occasionally referred to hereinafter as recognized product instance(s). Additionally, the object recognition data preferably includes location information (relative to the image) for the identified product(s), if any, within the image, i.e., x, y coordinates in the image. Note that the object recognition data may not identify any recognized products, which may nevertheless be useful information when determining whether a stock out condition exists, for example. Given the nature of most inventory environments in which multiple products from different vendors and in different product classes are likely to be present, the at least one recognized product instance may include single or multiple recognitions of a single or multiple products (e.g., multiple recognitions of bottles of "COKE" soft drink, recognition of a single bottle of "COKE" soft drink and multiple recognitions of bottle of "PEPSI" soft drink, multiple recognitions of bottles of both "COKE" and "PEPSI" soft drinks and multiple recognitions of "SOLO" plastic cups, etc.).

Figure 3:
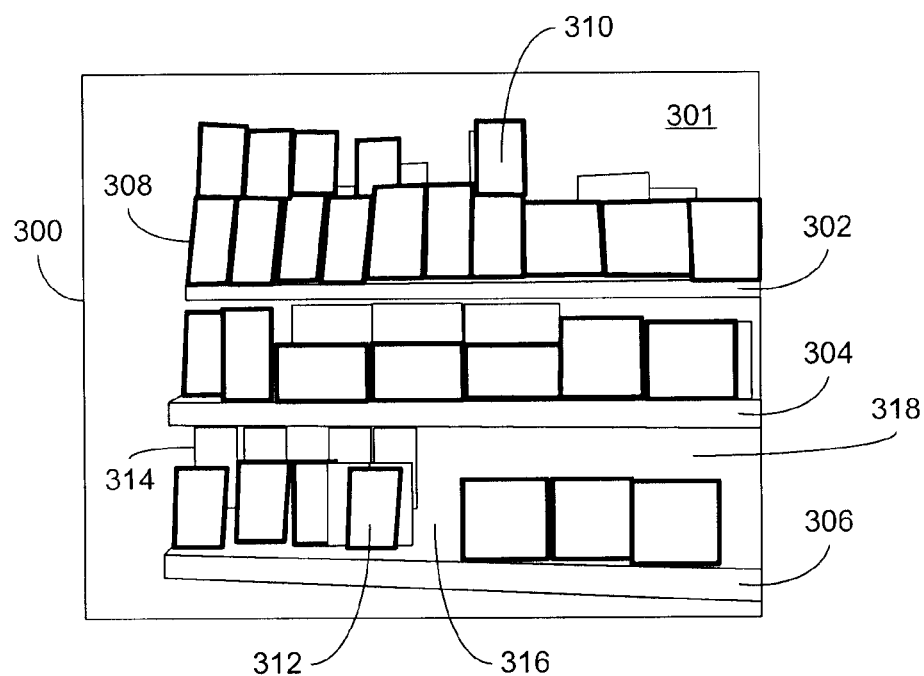
FIG. 3 is an exemplary image taken from an inventory environment and illustrating the display of multiple products.

This is further illustrated with reference to FIG. 3. In particular, FIG. 3 illustrates an exemplary image 300 of an inventory environment 301 in which a plurality of product support devices (in this case, shelves) 302-306 are used to display a variety of products 308-314. In this instance, the image 300 is captured by an image capture device positioned approximately at the height of the top-most shelf 302. A typical image may also comprise a variety of other objects (e.g., price tags on the shelves, occluding objects such as shopping carts or people, promotional materials, etc.) not shown in FIG. 3 for ease of illustration. In a presently preferred embodiment, the image capture device used to capture the image is positioned distally relative to the desired location, e.g., the shelves 302-306. Depending on the particular configuration of the inventory environment, e.g., relatively closely spaced rows of shelves, as in the case of a grocery store, it may be desirable to position the image capture device(s) somewhat above the shelves. As is often the case, and as shown in FIG. 3, the products 308-314 are not "ideally" arranged. For example, some products 308 may be rotated or otherwise misaligned so that they are not facing forward, others 310 may be inappropriately stacked upon one another, and still others 312 may be positioned so as to occlude other products 314. Further still, gaps 316 and shadowed regions 318 may also be present in the image such that no particular products are recognizable. Preferably, the object recognition analysis capability employed is capable of handling such non-optimal characteristics in an image to nevertheless provide, where possible, one or more recognized product instances, illustrated in FIG. 3 as products illustrated with heavy lines.

The object recognition analysis performed at block 208 may also take into account occlusion or obstruction information that can be developed based on additional analysis of the image. For example, in a crowded grocery store or similar operation, there is a significant possibility that, for an image of a given location within the inventory environment, there will be an obstruction blocking at least a portion of the "normal" view that would otherwise be available. For example, one or more people or shopping carts may block the view of certain products. If obstructions (or other causes such as insufficient lighting or image resolution) prevent detection of products in an entire image, or at least a portion of an image, then the entire image, or that portion that is prohibitively obstructed (or otherwise ill-suited for image analysis), may be discarded or ignored in favor of another image of the same location captured from a different viewpoint and/or captured at a substantially similar, if not identical, point in time. That is, it is preferred wherever possible to use any portion of an image that is not obstructed or otherwise deficient. Techniques used to detect obstructions may be based on the types of obstructions to be detected. For example, several techniques are well known for detecting the existence of people and motion within an image. For example, people tracking techniques are described in: J. K. Aggarwal and Q. Cai. "Human Motion Analysis: A Review". Computer Vision and Image Understanding: CVIU, Vol. 73, No. 3, pp. 428-440, 1999; I. A. Essa. "Computers Seeing People". AIMag, Vol. 20, No. 2, pp. 69-82, 1999; D. Gavrila. "The Visual Analysis of Human Movement: A Survey". Computer Vision and Image Understanding, Vol. 73, No. 1, pp. 82-98, January 1999; and Ismail Haritaoglu, David Harwood, and Larry Davis. "W4: Who? When? Where? What? A Real Time System for Detecting and Tracking People". In: Proceedings 3rd International Conference on Face and Gesture Recognition, Nara, Japan, April 1998, the teachings of which references are incorporated herein by this reference. Additionally, the detection of face-like features may be used to detect the presence of people and may be implemented using, for example, the face recognition capabilities found in Intel Corporation's OpenCV (Open Source Computer Vision) libraries. Other techniques may be employed to detect certain objects like shopping carts. For example, object recognition, as described above, may be employed based on training images of shopping carts from various angles. Additionally, line detection algorithms may be employed to detect the existence of substantially parallel lines relatively closely spaced together, often indicative of the vertical structural members of a shopping cart basket, or shape detection algorithms may be used to detect the outlines of a shopping cart or the circular shape of shopping cart wheels. Further still, color and/or texture detection techniques may also be employed (alone or in conjunction with any combination of the above-described techniques) to detect characteristic features of shopping carts, e.g., relatively shiny, metallic structural members of shopping carts. With particular regard to shopping carts, information regarding the location and/or movement of shopping carts detected using these techniques may be used to determine the behaviors of people within the inventory environment. For example, frequent and continuous detection of shopping carts in a given area may be indicative of a high-traffic environment. Additionally, the detection of shopping carts for relatively extended periods of time in front of certain product displays may be indicative of (in a positive sense) significant consumer interest in the displayed products and/or promotional materials or (in a negative sense) the presence of an obstruction or other condition inhibiting the flow of traffic around the particular area.

Referring once again to FIG. 2, processing continues at block 210 where an extracted planogram is generated based on the object recognition data (and possibly shelf detection) and provided as output. In particular, the extracted planogram includes the locations and possibly the images of the product or products corresponding to each of the at least one recognized product instances, if any. An example of this is illustrated in FIG. 4.

Figure 4:
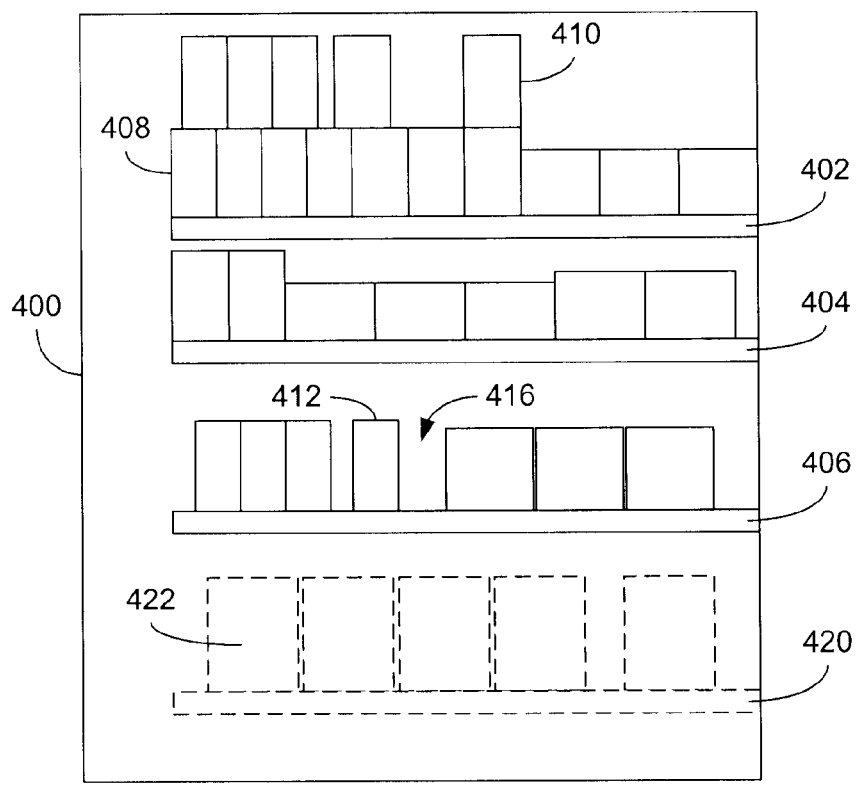
FIG. 4 is an exemplary extracted planogram, based on the exemplary image of FIG. 3, provided according to an embodiment of the present invention.

FIG. 4 illustrates an extracted planogram 400 based on the exemplary image 300 of FIG. 3. As shown, the extracted planogram 400 illustrates shelves 402-406 corresponding to the shelves 302-306 recognized in the image 300. In a presently preferred embodiment, a location of the shelves within the image 300 is determined by the object recognition analysis or any other suitable technique such as, by way of non-limiting example, through the use of known edge detection algorithms to identify relatively long, continuous edges within the image. Thereafter, using known geometrical transformation techniques, the location of the shelves 302-306 within the image may be translated into an actual location of the shelf within the inventory environment, which may be reflected by the position of the shelves 402-406 illustrated in the extracted planogram 400. In order to determine the actual location of the shelves, position information of the image capture device within the inventory environment is used. In a presently preferred embodiment, the position information includes spatial coordinates (e.g., x, y, z) of the camera's imaging plane as well as vertical and horizontal tilt, field of view, zoom factors, height within the inventory environment, etc. of the image capture device. Based on this information, as well as other ascertainable information known to those of skill in the art (such as overall height of the shelves, distance from the shelves to the imaging plane of image capture device, etc.), the coordinates of recognized objects, e.g., shelves, within the image to actual locations can be mapped to actual locations within the inventory environment 301. Similar mapping is used to translate the position information of the various recognized product instances within the image to actual locations of the products within the inventory environment 301, 102. To the extent that the object recognition data may not include any recognized product instances, the extracted planogram, or at least that portion of it corresponding to the analyzed image(s), may not include any information corresponding to recognized products.

With knowledge of the identities of products corresponding to the one or more recognized product instances (shown in bold in FIG. 3) as well as their actual locations within the inventory environment, the extracted planogram 400 may include a corresponding image 408-412 of the recognized products at locations within the extracted planogram 400 corresponding to their actual locations within the inventory environment 301, 102. Once again, techniques for mapping actual locations within an inventory environment to corresponding locations within a planogram representation are well known in the art. In a similar vein, gaps between products 416, misalignments or other display imperfections may also be illustrated in the planogram 400, thereby reflecting the current state of the shelves. As also shown in the extracted planogram 400, the location of additional shelves 420 and products 422 may also be illustrated. This is possible due to the fact that multiple images (none of which separately fully captures a given product support device, but do so collectively) may be employed when creating the extracted planogram 400. For example, based on multiple, substantially contemporaneous images, it may be determined that the bottom-most shelf within a given image resides below the second shelf 306 depicted in the exemplary image 300 of FIG. 3 by virtue of the fact that the second shelf 306 is represented in both images. With this knowledge (i.e., the linkage between images including the second shelf 306 and/or the known camera locations), the planogram generation software can effectively add the additional shelves 420 and products 422 to the extracted planogram 400, thereby providing an overall image of the shelves at the time the images were taken.

As described above, the object recognition data is applied directly to the generation of the extracted planogram. However, in practice, it is preferred to first filter the object recognition data before using it for any of the purposes described herein, including the extraction of planograms. This is preferred because image analysis is not perfect and occasionally provides false positive information, e.g., object recognition analysis will sometimes indicate recognized product instances that are, in fact, not there. Additionally, the existence of external factors unrelated to the performance of the image analysis, e.g., occlusions, changing lighting conditions, etc., may interfere with proper performance of the image analysis. As a result, it often becomes necessary to filter out such misleading occurrences in an individual or, more typically, a series of images.

For example, a given product may be recognized as being some distance above a corresponding shelf (by virtue of some other, unrecognized object beneath it). Rather than depicting the product as "hovering" above the shelf, it can be depicted in the extracted planogram as residing on the shelf. Similarly, implausible product recognitions, e.g., products that are "floating" in mid-air or bisected by a shelf, can be ignored. Products that are recognized at unlikely angles, e.g., products can likely be turned in non-90 degree angles in the z-axis, but most likely not in the x- and y-axes, may likewise be ignored. Because the stored data concerning the various possible products may also include information concerning the actual size of the product, product recognition instances that are contrary to the known size of products may be discarded, e.g., a box of corn flakes cannot be two meters wide.

Additional filtering may be achieved through comparison of multiple images over time. That is, comparisons over time may be needed to reliably determine that a given object should or should not be considered as recognized within multiple images. For example, object recognition analysis of an image may determine that two or more recognized product instances substantially overlap. This condition will typically require verification because it may be that, in fact, one or more products may be located behind another, but nevertheless are recognized. Alternatively, this may arise through multiple recognitions of a single product. By using either multiple images over time (e.g., use another image some time later) and/or over space (e.g., capture one or more additional images from different angles), it may be possible to rule either scenario in or out. Similar logic may be applied to those instances where potential occlusions or changed lighting conditions are detected. Once again, in these instances, the use of multiple, temporally- or spatial-diverse images may be employed to confirm or rule out certain recognition results.

Referring once again to FIG. 2, processing optionally continues at block 212 where the extracted planogram is compared to a target planogram. In a presently preferred embodiment, the target planogram may comprise another extracted planogram based on one or more additional images (or even the same image using different object recognition techniques) or an optimal planogram. As used herein, an optimal planogram represents the ideal display of one or more products as originally envisioned by a planner. The comparison of the extracted planogram to a target planogram may be used to identify differences between the compared planograms. As noted above, planograms comprise a list of products and (relative) positions and orientations. Preferably, the desired comparison is based on comparison of the distances between product centers and their orientations. Such differences may include, but are not limited to, horizontal or vertical deviations of products from their desired locations, the failure to detect products at their expected locations, or the addition of unexpected products relative to the target image.

Based on any identified differences between the extracted and target planograms, processing may optionally continue at block 214 where a relative cost of the differences between the planograms and for each product (or class of products) is determined. For example, in one embodiment, horizontal displacement of a given product relative to the target planogram may have a relatively low cost associated therewith. Additionally, vertical displacement of a given product relative to the target planogram may have an intermediate cost associated therewith. On the other hand, products that are missing altogether from the extracted planogram in comparison with the target planogram may have relatively high costs associated therewith. Still other costs, determined as a matter of design choice, may be associated with other detectable differences such as the presence of additional, unplanned products or the presence of additional facings of desired products, etc. Based on various costs calculated based on the identified differences, an overall cost (or various sub-totals corresponding to desired particular aspects of a given planogram, e.g., "only the soft drinks") of the differences may be calculated as a way of measuring effectiveness of current inventory management techniques. It is noted that the comparison and/or cost determinations of blocks 212 and 214 may be performed over a series of temporally-diverse extracted/target planograms in order to discern trends or other time-dependent developments. Further still, at block 216, the various information developed through the processing of blocks 202-214 may be used as the basis for taking various actions. For example, the extracted planogram or cost information may serve as the basis for sending an alert or other indication to appropriate personnel. For example, if the cost difference between the extracted and target planograms is sufficiently great, it may be desirable to instruct stock clerks to inspect the affected area and take any necessary remedial actions. Those having ordinary skill in the art will appreciate that various other actions based on the information derived in accordance with the processing of FIG. 2 may be readily derived.

Figure 5:
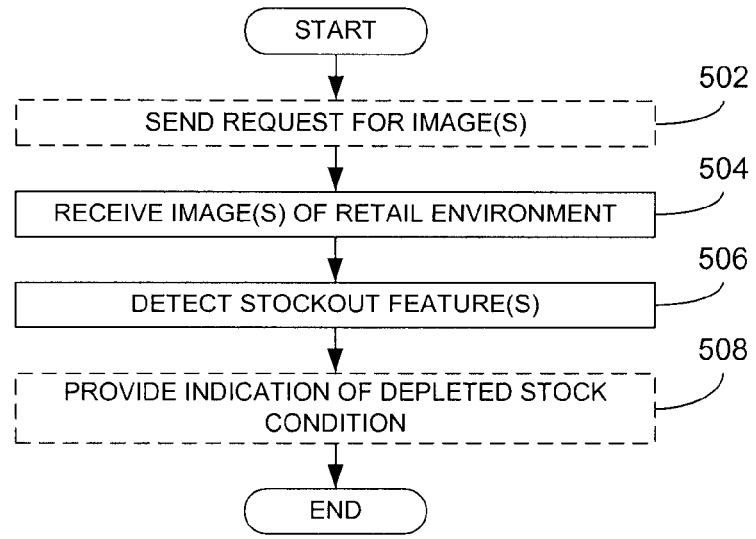
FIG. 5 is a flow chart illustrating a technique for providing an indication of a depleted stock condition based on the detection of stock out features in accordance with an embodiment of the present invention.

Referring now to FIG. 5, a technique for determining depleted stock conditions is illustrated. Beginning at block 502, at least one image may be optionally requested (or automatically provided) as previously described. Subsequent to receipt of the at least one image of the inventory environment at block 504, processing continues at block 506 where the at least one received image is analyzed to detect the existence of at least one stock out feature within the at least one image. As used herein, a stock out feature is any kind of detectable feature within the image that may be recognized through image analysis and used to indicate that one or more products may be missing from a product support device. An example of this is further illustrated with reference to FIGS. 6 and 7 below. It is noted that the detection of stock out features of block 506 preferably incorporates the filtering procedures described above to minimize the detection of false positive detections of stock out features, or to accommodate the possibility that otherwise detectable stock out features are occluded, in poor lighting, etc.

Figure 6:
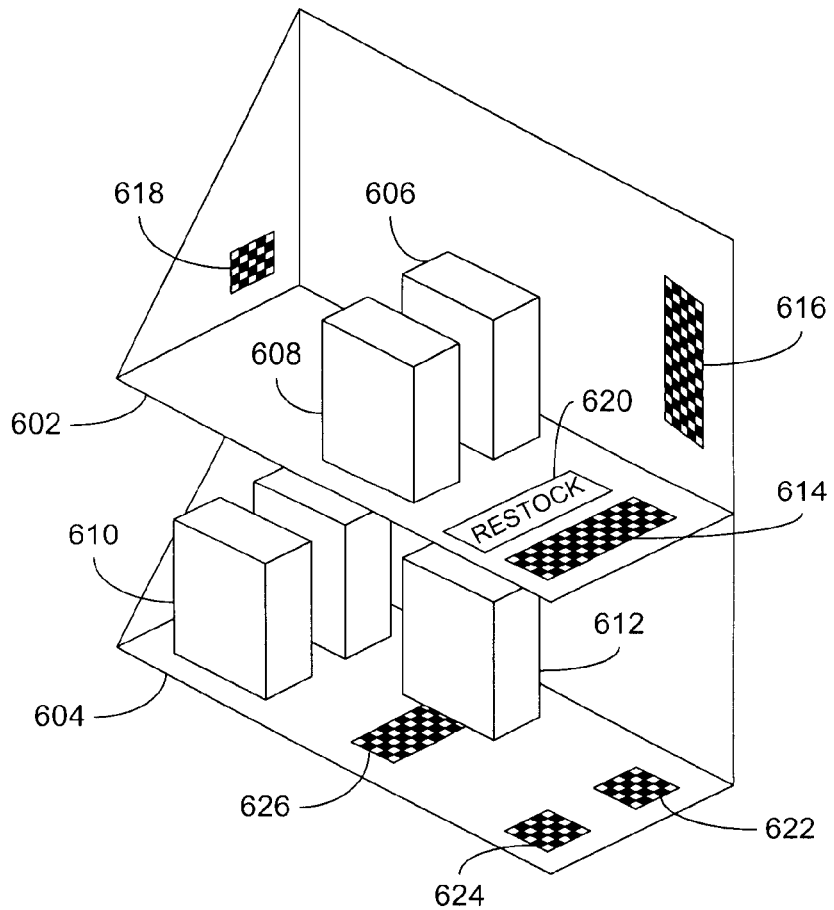
FIG. 6 is a schematic illustration of at least one product support device comprising one or more detectable patterns disposed thereon that may be used as stock out features to detect a depleted stock condition.

Referring now to FIG. 6, a plurality of shelves 602, 604 are illustrated having a variety of products 606-612 stored thereon. Additionally, various detectable patterns 614-626 may also be deployed on the shelves. The various patterns 614-626 may be permanently or temporarily affixed to virtually any surface of the shelves 602-604, particularly those that would be readily visible to an image capture device, using known techniques. For example, a first detectable pattern 614 is shown as being displayed on a top surface of the upper shelf 602. Further, a second detectable pattern 616 is illustrated on a back wall surface of the upper shelf 602. Further still, a third detectable pattern 618 is illustrated on a side wall surface of the upper shelf 602. In the first, second and third detectable patterns 614-618, the pattern comprises a high-contrast, highly organized (and, therefore, readily detectable) pattern of alternating black and white squares. Those having ordinary skill in the art will appreciate that other, functionally similar patterns, such as one- or two-dimensional bar codes or other high-contrast colors/patterns, may be equally employed for this purpose. Where patterns such as barcodes or other patterns capable of encoding information are used, the patterns may be used to encode information about the products with which they are displayed, e.g., identities, shape, size, quantities, prices, etc. of the associated products. In yet another embodiment, a fourth detectable pattern 620 comprising textual markings may also be provided. In this embodiment, human-readable text is employed, which text may be recognized through the use of known optical character recognition techniques. Further still, other distinguishing characteristics, such as unique colors, shapes or textures, could be incorporated into the detectable patterns in order to enhance their detectability and/or their ability to convey relevant information once detected.

Multiple detectable patterns 622, 624 (presumably perceivable, if not obstructed, by a given image capture device) may also be employed as a means of determining the degree in which products have been depleted from a shelf. That is, if both of the multiple detectable patterns 622, 624 are obstructed, and therefore not detected, it may be inferred that the inventory of displayed products has not been substantially depleted. At the other extreme, if both detectable patterns 622, 624 are not obstructed and subsequently detected, it may be inferred that the inventory of displayed products has been substantially, if not completely, depleted. Further still, if only one of the detectable patterns 624 is not obstructed and therefore detected, it may be inferred that an intermediate level of stock depletion has occurred. Alternatively, a larger, continuous detectable pattern of known dimensions, such as the seventh detectable pattern 626, may be employed such that detection of a portion of the detectable pattern serves as an indication of the magnitude of the at least partially depleted stock condition. In this embodiment, a size of the detected portion of the pattern 626 can be determined and compared to the known size of the pattern 626. The resulting level of stock depletion (or level of remaining stock) can thereafter be determined as being proportional (or inversely proportional, in the case of remaining stock) to the ratio of the detected portion of the pattern 626 to the known size of the pattern 626.

Figure 7:
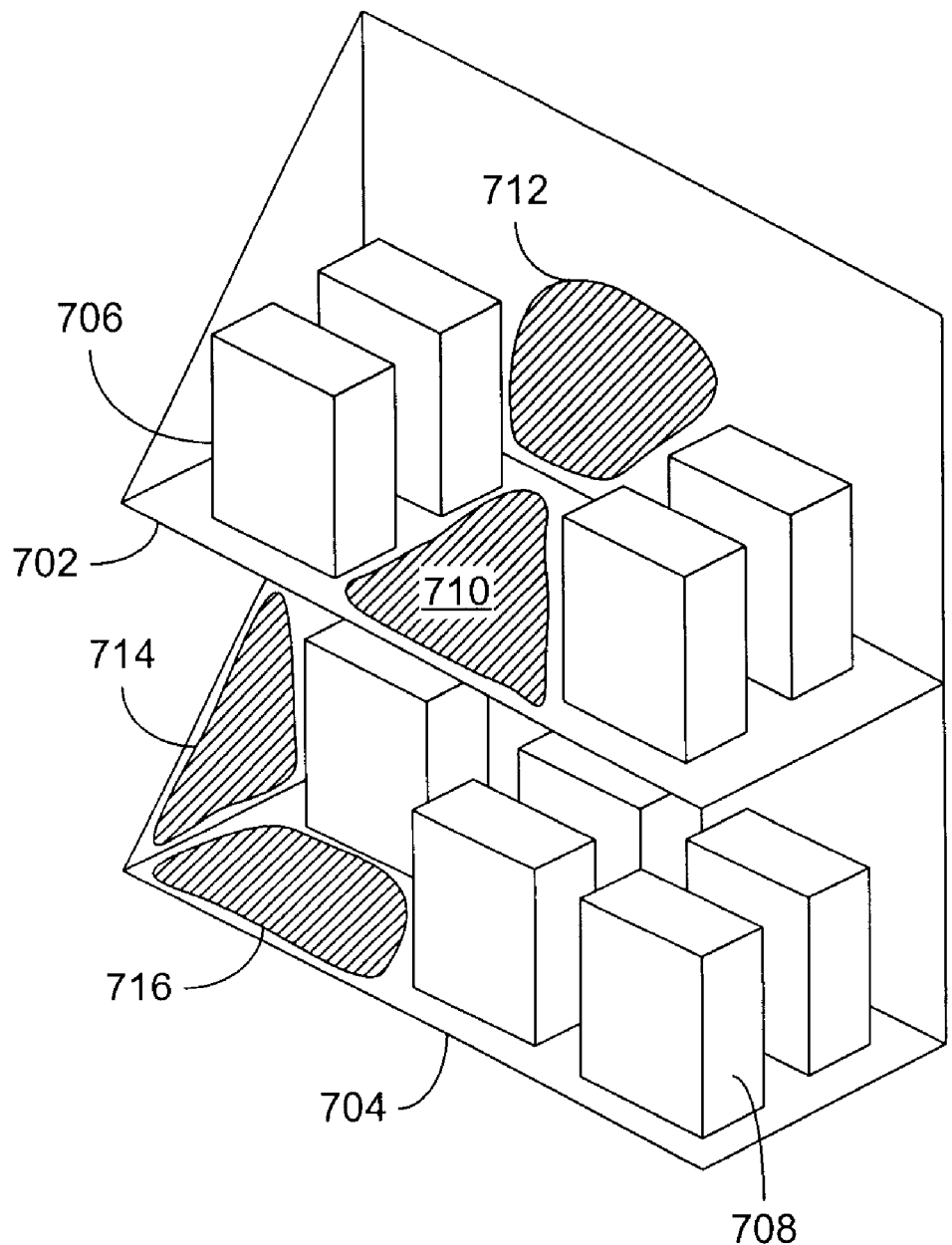
FIG. 7 is a schematic illustration of at least one product support device in which one or more known features of at least one product support device are used to detect a depleted stock condition.

In yet another embodiment, rather than relying on detectable patterns deployed on the various shelf surfaces, known features of the shelves may be equally employed as the stock out features in the image. For example, the colors, shapes and/or textures of the shelves themselves may be used. Further still, known lighting conditions near (above, below, etc.) the shelf may give rise to particular shadowed features within a given image. Once again, these shadowed features may be employed as stock out features suitable to indicate the state of displayed inventory depletion. This is illustrated in FIG. 7 where a plurality of shelves 702, 704 have stored thereon a plurality of products 706, 708. Using the known features of the shelves (colors, shapes, textures, etc.), if relatively large regions of such features 710, 712 (as compared, for example, to a suitably chosen threshold) are detected, it may be inferred that stock levels are at least partially depleted because these normally obstructed features have been detected. As in previous embodiments, the relative size of the detected regions 710, 712 may be used to infer the level of stock depletion/stock remaining. Similarly, the detection of shadowed or abnormally bright regions 714, 716 may also be used to infer the absence of displayed inventory. In practice, detection of colors, etc. of shelves described above can be achieved using so-called Gaussian mixture models. Using this technique, the various image capture devices are trained to interpret a collection of colors, per pixel, that correspond to an empty shelf (or shadow, etc.) based on a series of images over time of a specific location, possibly under a variety of lighting conditions. These pixels are then aggregated into regions.

Referring again to FIG. 5, if one or more stock out features are detected at block 506, processing may continue at block 508 where an indication of the at least partially depleted stock condition may be provided to appropriate personnel. For example, the indication may be provided to the stock clerk responsible for that portion of the inventory environment in which the stock out feature is detected. Additionally, to the extent that the level of stock depletion may be determined based on the detected stock out feature(s), the indication may likewise reflect the degree of stock depletion. In a presently preferred embodiment, the indication of the at least partially depleted stock condition is provided only after the stock out feature(s) have been detected for a predetermined period time. If, during that time, obstructions are detected, the provision of the indication may be postponed for a length of time to account for the duration of the obstructions.

Figure 8:
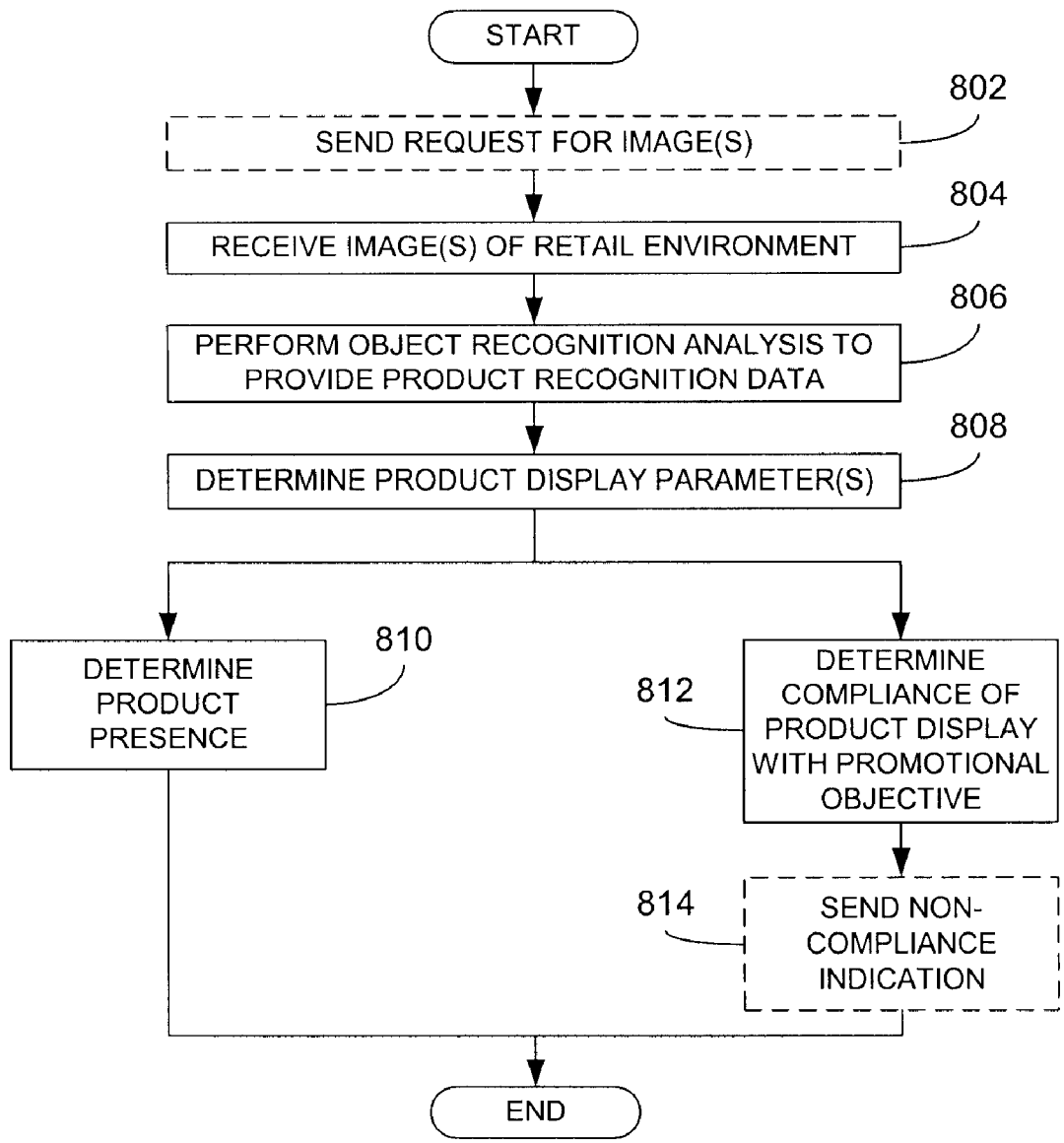
FIG. 8 is a flow chart illustrating a technique based on detection of product display parameters.

Referring now to FIG. 8, various techniques based on the determination of product display parameters are further illustrated. Beginning at block 802, one or more images may be requested (or automatically provided) as previously described. Subsequent to receipt of the one or more images of the inventory environment at block 804, processing continues at block 806 where object recognition analysis is applied to the one or more received images to provide the object recognition data (which may or may not include at least one recognized product instance), as described above. Once again, it is noted that the provision of object recognition data of block 806 preferably incorporates the filtering procedures described above to minimize the detection of false positive or to accommodate the possibility that otherwise recognizable features are occluded, in poor lighting, etc. Assuming that the object recognition data does include at least one recognized product instance, processing continues at block 808, where at least one product display parameter for a product corresponding to any of the at least one recognized product instance is determined. Product display parameters are various parameters used to measure a given product's display ubiquity and/or display quality (or lack thereof) within the inventory environment as indicated by various quantifiable characteristics of the product as it is displayed.

For example, as known in the art, a "facing" of a product is an instance in which the product is recognizable as it is displayed. The relative quality of a given product facing may be determined, at least in part, upon the location of the product facing. Thus, one product display parameter may comprise the number of facings of the product within the entire inventory environment or one or more portions thereof. Similarly, additional product display parameters may comprise locations of facings of the product (e.g., top-shelf, bottom-shelf, aisle X, aisle Y, distance from the ends of the aisle, distance between complementary products, etc.), as well as distance between facings of the product. Regarding distances between facings, straight-line distances may be calculated based on knowledge of the actual locations of the facings within the inventory environment, or walking distances/times between the relevant locations (i.e., between a shelf corresponding to a first instance and another shelf in another aisle corresponding to a second instance) may be calculated using known path mapping techniques. As further known in the art, the display height of a product is often a key determinant in the successful sales of the product and therefore may comprise a useful display parameter. In a similar vein, proximity of a product to a second product may comprise an additional, useful display product parameter. For example, if the first product is a type of condiment, it may be instructive to know the proximity of that product to complimentary products such as other condiments. As a further example, it may be desirable to know the location and proximity of a given product to competitive products of a similar type. As described above, proximity of products may determined based on comparison of product centers (x, y, z coordinates) and/or three-angle orientations. Proximate/not proximate decisions could be made based on chosen threshold values or raw distance data could be provided as a result. In a presently preferred embodiment, proximity may again be described as walking distances/times or, more simply, by a determination whether the products are on the same or different shelves.

Further still, the processing performed at block 806 to provide the object recognition data may be also applied to recognize one or more promotional material instances within the images. For example, the object recognition analysis can be applied to determine whether coupon dispensers, advertising placards, etc. are found within the images. When such promotional material instances are recognized in the images, an additional product display parameter may comprise the determination of proximity of a product to one or more of the promotional material instances using the same techniques described above for determining proximity between products. Also, the presence of the promotional materials (i.e., the relative ubiquity and/or quality of display of the promotional materials, as described below) can be determined. For example, using these techniques, it is possible to measure how often promotional materials are occluded by a shopping cart, or their relative proximity to known high-traffic areas.

Based on the one or more product display parameters determined at block 808, processing may continue at either block 810 or 812. Referring first to block 810, processing continues where a presence for the product is determined. A product's presence is a description of a product's relative degree of beneficial display within the inventory environment. That is, the presence indication goes beyond the mere fact of whether a given product is displayed, or not, within the inventory environment, but instead attempts to measure the display of the product along two dimensions—both quantity of presentation and quality of presentation. That is, by monitoring more frequently and in a more detailed manner than is the custom today, the observed degree of presence of a product within an environment. In this manner, the present invention provides various techniques for enabling new promotional performance metrics and approaches. For example, based on recognized product instances, it can be documented that a particular product had an average presence of 15 facings in 4 locations over the last 300 15-minute observations, ranging from 2 observations with stock outs in 2 locations and 283 observations with full compliance to a promotional objective. Such level of granularity enables changes in the nature of the service level agreements that may be negotiated, thereby changing the nature of the promotions that can be sold. In addition this data constitutes valuable industry data on the performance of products that may itself become a salable asset or provided as a service to interested third parties (e.g. non-competitive retailers, packaged goods companies, etc).

As another example, for a given product, the total number of facings of the product in the inventory environment may be considered a rough, first approximation of that product's presence. To refine this presence indication, the subtotal of facings at different display heights or locations (e.g., bottom shelf, eye-level shelf, end cap display, etc.) may be weighted according to the perceived qualities of each of the different display heights or locations. For example, consider the following example illustrated in Table 1:

TABLE 1

| Height/Location | No. of Facings | Weighting | Weighted Contribution |
| --- | --- | --- | --- |
| Top Shelf | 10 | ×3 | 30 |
| Mid-Level Shelves | 20 | ×5 | 100 |
| Bottom Shelf | 10 | ×2 | 20 |
| End Cap | 10 | ×5 | 50 |
| Total Facings | 50 | Weighted Total | 200 |

In the example illustrated in Table 1, the weightings are chosen such that facings on mid-level (i.e., eye-level) shelves and end caps are most highly (favorably) weighted, whereas facings on bottom shelves are weighted lower (less favorably). In this example, the presence value may be calculated as the Weighted Total divided by the Total Number of Facings (i.e., 200/50) for a value of 4 (with a maximum possible value of 5). However, if the same total number of facings is found, but distributed differently, as set forth in Table 2, the presence value improves to a value of 4.4 (i.e., 220/50) given the greater number of facings found in the more favorably weighted end cap display locations.

TABLE 2

| Height/Location | No. of Facings | Weighting | Weighted Contribution |
| --- | --- | --- | --- |
| Top Shelf | 0 | ×3 | 0 |
| Mid-Level Shelves | 20 | ×5 | 100 |
| Bottom Shelf | 10 | ×2 | 20 |
| End Cap | 20 | ×5 | 100 |
| Total Facings | 50 | Weighted Total | 220 |

The examples set forth in Tables 1 and 2 illustrate one potential algorithm for assessing the quantity and quality of facings of a given product, although those of ordinary skill in the art will readily appreciate that a variety of assessment techniques in this vein may be devised. As noted above, other product display parameters determined at block 808 may be incorporated into the presence rating as a matter of design choice. For example, a product's presence rating may be increased with each facing within a threshold proximity of a complementary product and/or within another threshold proximity of corresponding promotional material. Conversely, a product having a large percentage of its total facings within a relatively small distance of each other (i.e., clustered in one region of an inventory environment as opposed to spread more evenly throughout) may have its presence rating lowered as a result. Once again, the relative contribution of such product display parameters may be selected as a matter of design choice. Indeed, such contributions may vary according to the specific inventory environment under consideration, e.g., the contribution of proximity between complementary facings may be more favorably weighted in grocery stores than household appliance stores.

Alternatively, processing may continue at block 812 where compliance of a product's display with a promotional objective may be determined. For example, it is not uncommon for product manufacturers to contract with stores to ensure that a minimum number of facings of that manufacturer's products are always present within the inventory environment. Further still, arrangements may be made to ensure that certain minimum quality levels of a given product's promotional display are maintained at all times. Therefore, using the product display parameters obtained at block 808, the compliance of the display of a given product may be measured and compared with the desired promotional objective. In the event that substantial noncompliance of the product with the desired promotional objective is determined, processing may continue at block 814 where a noncompliance indication is provided to appropriate personnel, such as a store manager, auditors, advertising representatives, etc. Non-compliance may be judged by the level of deviation (in terms of, for example, position, number of facings, relative availability/duration of stock outs throughout a day, etc.) from desired parameter levels.

Figure 9:
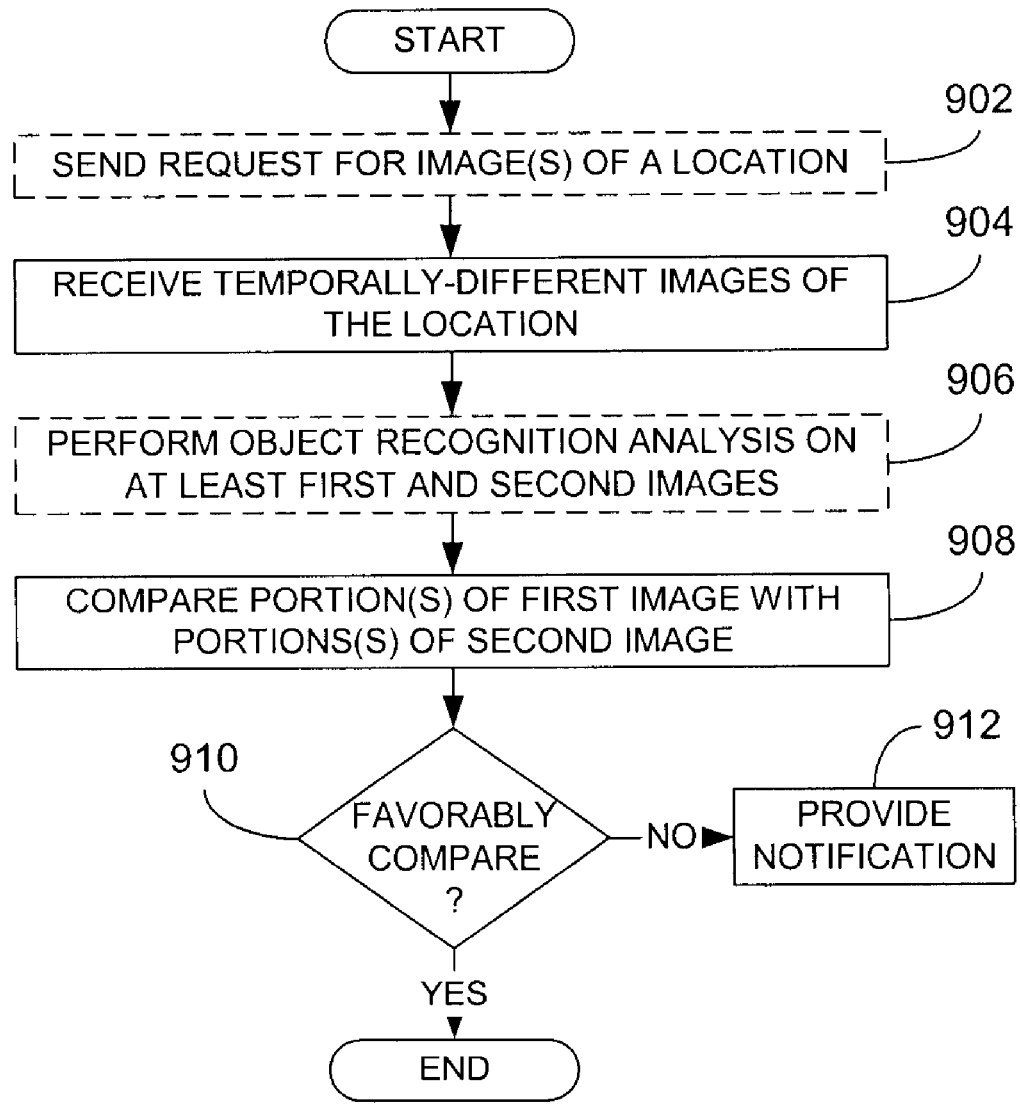
FIG. 9 is a flow chart illustrating a technique for providing an indication of a potential condition requiring response based on comparison of images that are temporally different.
Figure 10:
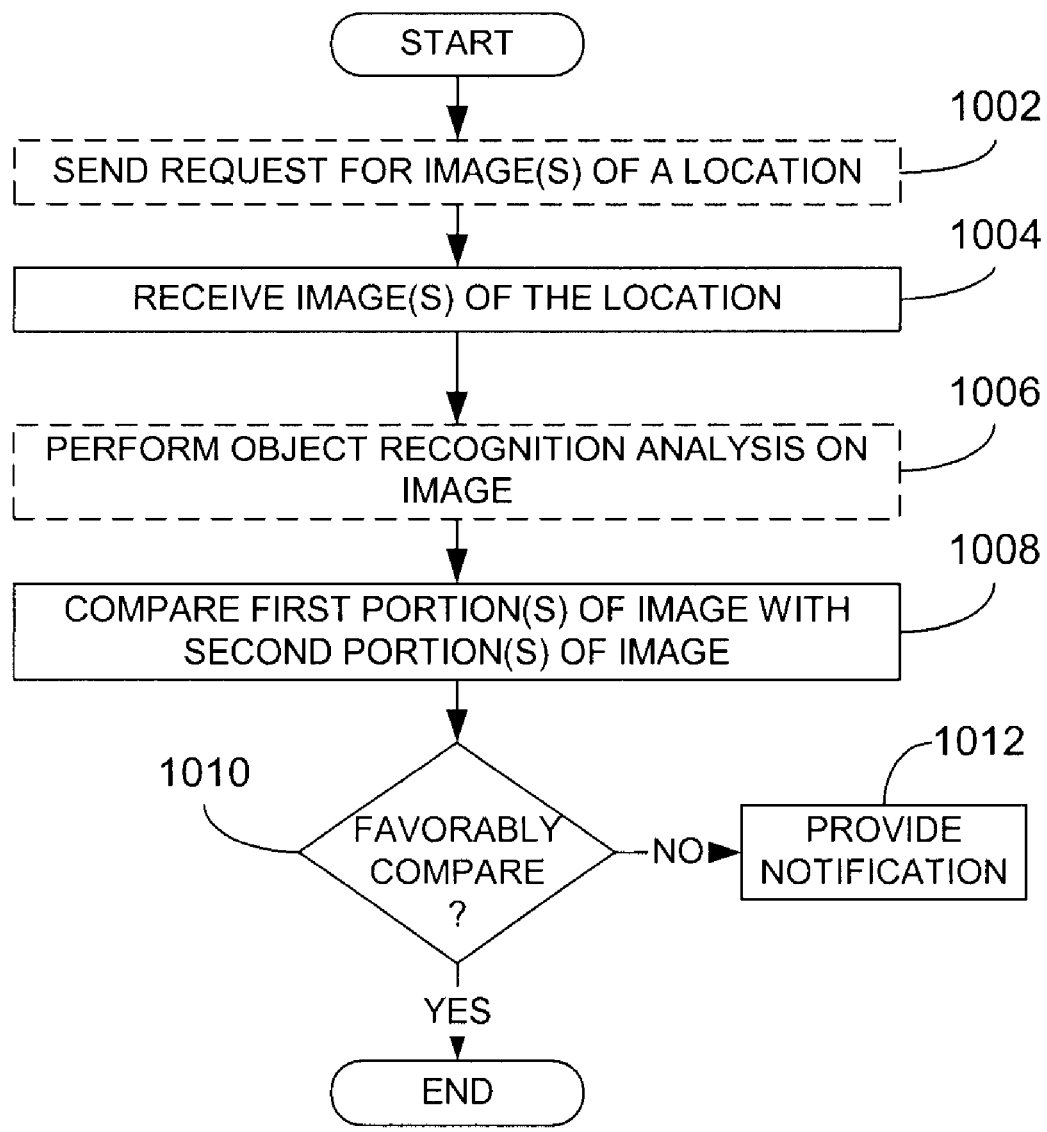
FIG. 10 is a flow chart illustrating a technique for providing an indication of a potential condition requiring response based on comparison of portions of a single image.

Referring now to FIGS. 9 and 10, various techniques for detecting potential conditions requiring response by personnel are further illustrated. More particularly, FIG. 9 illustrates a technique based on comparison of temporally different images, whereas FIG. 10 illustrates a technique based on comparison of different spatial regions of a single (or multiple) images. Referring now to FIG. 9, processing begins at block 902, where one or more images may once again be requested (or automatically provided) as previously described. In this instance, however, the requested images (or automatically provided images) are temporally different images of a given location. That is, the multiple images received at block 904 are of a single location taken over a period of time.

At block 906, object recognition analysis as described above may optionally be applied to at least a first and second image (preferably, more in order to obtain more reliable results through the use of the filtering operations described above) of the received images. Although it is presently preferred to perform such object recognition analysis on the first and second images (or more, as needed), this is not a requirement as the subsequent comparison step of 908 may be performed without the object recognition analysis. Thus, at block 908, portions of the first image are compared with portions of the second image. In particular, the comparison of block 908 attempts to measure the degree of similarity between the corresponding portions of the first and second image. In the case where object recognition is performed on each image, the comparison may entail comparing the identities of the products corresponding to recognized product instances (if any) at similar locations in the images. Alternatively (or additionally, where object recognition has been performed), other comparison techniques, such as those described above, may be employed to assess the degree of similarity between the corresponding portions of the images. Once again, the filtering operations needed to minimize false positives/account for extenuating circumstances may be equally employed in the processing of block 908 to better ensure reliability. Thereafter, at block 910, it is determined whether the comparison of the portions of the first and second images was favorable. If not, processing continues at block 912 where a notification of a potential condition requiring response is provided to the appropriate personnel.

For example, the comparison at block 910 may be based on whether the portion of the first image substantially matches the portion of the second image. Conversely, the comparison at block 910 may be based on whether the portion of the first image does not substantially match the portion of the second image. With reference to the former scenario, if a recognized product instance is present in a given portion of the first image, but is not present in the same portion of the second image, as determined by the comparison of block 910, this may be an indication that a given product has been depleted, that restocking is necessary, or that the product has been obscured by something. The nature of the notification provided at block 912, as a matter of design choice, will obviously depend on the nature of the specific condition detected and its interpretation given the specific circumstance of the inventory environment.

Referring now to FIG. 10, processing similar to that illustrated in FIG. 9 is likewise illustrated. However, in the technique described in FIG. 10, rather than basing the comparison on multiple images separated by time periods, processing is performed on a single image, but between different spatial portions of that image. Thus, processing of blocks 1002 through 1006 is substantially similar to the processing described above at blocks 902 through 906, including the optional use of object recognition analysis. Thereafter, at block 1008, however, comparison is made between a first portion of an image with a second portion of that same image. In this embodiment, the desirable filtering techniques described above may once again be employed. However, to the extent that processing of FIG. 10 is preferably centered on a single image, it may be preferred that the multiple images used for filtering are spatially-diverse or, at the very least, minimally temporally-diverse (i.e., obtained over a short period of time). Thereafter, at block 1010, the determination is made whether the comparison was favorably and, if not, processing continues at block 1012 where notification of the potential condition requiring a response is provided. For example, it may be desirable to compare the contents of one shelf within an image with the contents of another shelf either above or below that first shelf. Likewise, comparison of products adjacent to a given product may also be performed.

The information provided using any of the various techniques described herein (extracted planograms and/or resulting cost difference determinations; stock out detections; product display parameter determinations and/or resulting product presence and promotional compliance determinations; or determinations of potential conditions requiring response) may be used by any of a number of relevant parties. For example, the head-office of a retail chain may desire data concerning and corresponding insight into promotion compliance, restocking information per branch/region, employee & branch performance, out-of-stock per products, etc. Once again, other interested parties will be readily identifiable by those having ordinary skill in the art.

Additionally, although the various techniques described above have been described substantially independent of one another, in practice, combinations of these techniques may be beneficially employed. For example, a potential method for stock-out detection may combine both the object recognition and planogram matching techniques described above. In this scenario, when a product is not detected in or near a certain region, and the product is specified to be located there according to a target planogram, and there is no occlusion detected, and further assuming that the appropriate filtering procedures have been employed, then the product could be labeled as missing. Expressing this in a more granular fashion, a score function (based, for example, on the number of times this set of conditions is consecutively detected) could be used to assess the relative certainty that the product is out of stock over time. In the event that the score exceeds a threshold, the necessary alerts can then be provided.

As another example, a significant need in the industry is the desire to ascertain which specific locations give rise to the greatest levels of sales for a given product, particularly where multiple locations in a given inventory environment are being used. To this end, using the techniques described above, the differences between images (or planograms) can be used to infer the rate of purchases of a given product (which rate of purchase inferences may be correlated with actual point of sale data) at the various locations throughout the inventory environment where the product is sold. Thereafter, the rate of sales differences for this product at the different locations can be compared to determine the best and worst performing locations.

As described above, the present invention provides various techniques for improving the efficiency and efficacy of inventory management technique. In particular, this is achieved through the application of image analysis techniques applied to images captured within inventory environments. For example, through the application of object recognition techniques to such images, it is possible to not only determine the existence of certain conditions, such as stock out conditions, but to also assess the display of products according to more sophisticated standards, such as overall product presence or compliance with promotional objectives. For at least these reasons, the above-described techniques represent an advancement over prior art teachings.

While particular preferred embodiments have been shown and described, it will be obvious to those skilled in the art that changes and modifications may be made without departing from the instant teachings. For example, where specific examples described above relied on the use of shelves, it is understood that other types of product support devices, e.g., racks or vertical displays, could be equally employed. It is therefore contemplated that any and all modifications, variations or equivalents of the above-described teachings fall within the scope of the basic underlying principles disclosed above and claimed herein.

What is claimed is:

1. A method comprising:
   receiving, by an image analysis server, an image of at least one product within an inventory environment;
   performing, by the image analysis server, object recognition analysis on the image based on stored product images provide product recognition data; and
   providing, by a planogram server in communication with the image analysis server, an extracted planogram, based on the product recognition data, indicating a current state visually representing actual locations of the at least one product within the inventory environment by mapping the actual locations of the at least one product within the inventory environment to corresponding locations within the extracted planogram.

2. The method of claim 1, further comprising:
   identifying, by the image analysis server, an image location of a product support device within the image; and
   mapping, by the planogram server, the location of the product support device in the image into an actual location of the shelf within the inventory environment,
   wherein the extracted planogram further illustrates the actual location of the product support device.

3. The method of claim 1, wherein the product recognition data includes at least one recognized product instance, and wherein extracted planogram includes for each of the at least one recognized product instance, a corresponding image of the recognized product instance.

4. The method of claim 2, further comprising mapping, by the planogram server, the image location to the actual location based on position information of an image capture device within the inventory environment used to capture the image.

5. The method of claim 1, further comprising:
   sending, by the image analysis server, a request for the image to an image capture device within the inventory environment.

6. The method of claim 1, further comprising:
   comparing, by the planogram server, the extracted planogram to a target planogram.

7. The method of claim 6, wherein the target planogram is either of a previously extracted planogram based on a previous image and an optimal planogram.

8. The method of claim 6, further comprising:
   determining, by the planogram server, a cost associated with differences between the extracted planogram and the target planogram.

9. A non-transitory, processor-readable medium having stored thereon executable instructions that, when executed, cause a processing device to:
   receive an image of at least one product within an inventory environment;
   perform object recognition analysis on the image based on stored product images to provide product recognition data; and
   provide an extracted planogram, based on the product recognition data, indicating a current state visually representing actual locations of the at least one product within the inventory environment by mapping the actual locations of the at least one product within the inventory environment to corresponding locations within the extracted planogram.

10. The processor-readable medium of claim 9, having stored thereon executable instruction that, when executed, further cause the processing device to:
    identify an image location of a product support device within the image; and
    map the location of the product support device in the image into an actual location of the product support device within the inventory environment,
    wherein the extracted planogram further illustrates the actual location of the product support device.

11. The processor-readable medium of claim 10, having stored thereon executable instructions that, when executed, further cause the processing device to include, in the extracted planogram, a corresponding image for each of at least one recognized product instance in the product recognition data.

12. The processor-readable medium of claim 10, having stored thereon executable instruction that, when executed, further cause the processing device to map the image location to the actual location based on position information of an image capture device within the inventory environment used to capture the image.

13. The processor-readable medium of claim 9, having stored thereon executable instruction that, when executed, further cause the processing device to:
    send a request for the image to an image capture device within the inventory environment.

14. The processor-readable medium of claim 10, having stored thereon executable instruction that, when executed, further cause the processing device to:
    compare the extracted planogram to a target planogram.

15. The processor-readable medium of claim 14, wherein the target planogram is either of a previously extracted planogram based on a previous image and an optimal planogram.

16. The processor-readable medium of claim 14, having stored thereon executable instruction that, when executed, further cause the processing device to:
    determine cost associated with differences between the extracted planogram and the target planogram.

17. A system comprising:
    an image capture device configured and disposed to capture an image of at least one product within an inventory environment; and
    an automatic planogram generator, in communication with the image capture device, operative to identify at least one candidate product based on a configuration profile listing products expected within a field of view of the image capture device, to perform object recognition analysis on the image based on stored product images corresponding to the at least one candidate product to provide product recognition data and to provide an extracted planogram, based on the product recognition data, indicating a current state visually representing actual locations of the at least one product within the inventory environment by mapping the actual locations of the at least one product within the inventory environment to corresponding locations within the extracted planogram.

18. An apparatus, comprising:
    an image analysis server, operative to receive an image of at least one product within an inventory environment, perform object recognition analysis on the image based on stored product images to provide product recognition data; and
    a planogram server, in communication with the image analysis server, operative to provide an extracted planogram, based on the product recognition data, indicating a current state visually representing actual locations of the at least one product within the inventory environment by mapping the actual locations of the at least one product within the inventory environment to corresponding locations within the extracted planogram.

19. The apparatus of claim 18, wherein the image analysis server is further operative to identify an image location of a product support device within the image and the planogram server is further operative to map the location of the product support device in the image into an actual location of the shelf within the inventory environment, wherein the extracted planogram further illustrates the actual location of the product support device.

20. The apparatus of claim 18, wherein the product recognition data includes at least one recognized product instance, and wherein the extracted planogram includes for each of the at least one recognized product instance, a corresponding image of the recognized product instance.

21. The apparatus of claim 19, wherein the planogram server is further operative to map the image location to the actual location based on position information of an image capture device within the inventory environment used to capture the image.

22. The apparatus of claim 18, wherein the image analysis server is further operative to send a request for the image to an image capture device within the inventory environment.

23. The apparatus of claim 18, wherein the planogram server is further operative to compare the extracted planogram to a target planogram.

24. The apparatus of claim 23, wherein the target planogram is either of a previously extracted planogram based on a previous image and an optimal planogram.

25. The apparatus of claim 23, wherein the planogram server is further operative to determine a cost associated with differences between the extracted planogram and the target planogram.

* * * * *